3,794,692
PROCESS FOR THE PRODUCTION OF SQUALENE-TYPE-HYDROCARBONS
Akira Komatsu, Susumu Akutagawa, Toshiaki Sakaguchi, and Taichi Someya, Tokyo, Japan, assignors to Takasago Perfumery Co., Ltd., Tokyo, Japan
No Drawing. Filed May 24, 1973, Ser. No. 363,700
Int. Cl. C07c 11/00, 11/14
U.S. Cl. 260—677 R                          14 Claims

ABSTRACT OF THE DISCLOSURE

Production of squalene-type-hydrocarbons by dimerizing conjugated diene compounds in a aliphatic alcohol in the presence of a catalyst consisting of bis-cyclooctadiene-nickel and a tri-alkyl phosphine.

BACKGROUND OF THE INVENTION

1. Field of the invention

This invention relates to a process for preparing squalene-type-hydrocarbons represents by Formula I

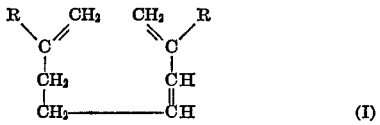

wherein R represents a saturated or unsaturated hydrocarbon group having 1–11 carbon atoms.

2. Description of the prior art

Various studies have hitherto been performed relating to the oligomerization of conjugated diene compounds using a catalyst system consisting of a transition metal and an organometal compound, and a number of literature and patent citations deal with this subject matter. For example, description with respect to butadiene is provided in greater detail in Angen. Chem., 78, 157 (1966) by G. Wilke. However, no successful process is known that selectively dimerizes a butadiene substitute having the general formula

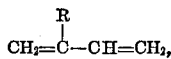

e.g., isoprene, myrcene, farnesene, etc., to form a squalene-type-hydrocarbon.

SUMMARY OF THE INVENTION

It is a primary object of the present invention to provide a novel process for manufacturing simply and advantageously squalene-type-hydrocarbons of Formula I

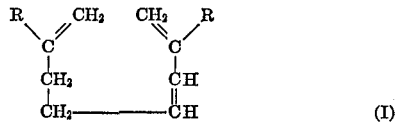

wherein R represents a saturated or unsaturated hydrocarbon group having 1–11 carbon atoms. These hydrocarbons are important raw materials for various medical supplies, industrial chemicals, cosmetics, etc. Above all, a dimerized product prepared from farnesene (wherein the substituent R in the Formula I is

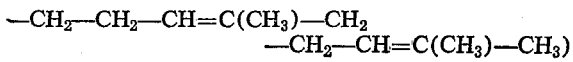

has the skeleton of natural squalenes and is useful as a raw material for cosmetics, machine oils, etc. If a squalene-type hydrocarbon obtained by dimerizing farnesene is hydrogenated in the presence of an Raney-Ni catalyst at 50 kg./cm.$^2$ hydrogen pressure at 150° C. for 3 hours, squalene having the same nature as natural squalene can be obtained. (Natural squalene is obtained from liver oil of sharks.)

This squalene is a raw material for various cosmetics and can also be used as a low temperature machine oil.

The inventors have found that conjugated diene compounds may selectively be dimerized at their 4-position carbon atom by using a catalyst system consisting of a complex derived from bis-cyclooctadiene-nickel and a trialkyl phosphine and as a solvent an aliphatic alcohol.

DETAILED DESCRIPTION OF THE INVENTION

More precisely, the present invention relates to new squalene-type-hydrocarbons of Formula I as well as to a novel process for the manufacture thereof which is characterized by reacting conjugated diene compounds of Formula II

wherein R has the same meaning as mentioned above, in an aliphatic alcohol in the presence of a catalyst consisting of bis-cyclooctadiene-nickel and a trialkyl phosphine, to dimerize the conjugated diene compounds by a 4—4 bond formed therebetween.

Examples of the conjugated diene compounds most often used in the present invention are isoprene, myrcene, farnesene, etc.

The bis-cyclooctadiene-nickel used in the present invention as a catalyst is one which is prepared by a known method, for example, by reducing a mixture of nickel-acetyl-acetonate and 1,5-cyclooctadiene by means of tri-ethyl-aluminum (see Angen. Chem. 72, 581 (1960) and French Pat. No. 1,320,729). The bis-cyclooctadiene-nickel provides a sufficient catalytic effect if used in an amount of 5 mmol or less per 1 mol of the conjugated diene compound starting material. Generally, excellent results are obtained when the amount of bis-cyclooctadiene-nickel 1–10 mmoles per 1 mole of conjugated diene compounds.

The trialkyl phosphines function as a ligand and are represented by the formula R'$_3$P (where R' represents an alkyl group having 1–10 carbon atoms). It is preferred to use the phosphines in an amount of 2–10 mols, particularly about 4 mols, per 1 mol of the bis-cyclooctadiene-nickel compound.

The aliphatic alcohol or alcohols used as a solvent in the present invention are preferably represented by the formula R"OH (where R" represents an alkyl group having 1–8 carbon atoms) and it can be any primary, secondary or tertiary alcohol, e.g., secondary-butyl alcohol, cyclohexanol, benzyl alcohol, etc. The amount thereof used is not limited, but is preferably 20–40% (by volume) on the basis of the conjugated diene compounds to give a favorable effect.

In the above mentioned catalyst system, the trialkyl phosphine displays the function in the binding of the conjugated diene compounds, and thus the conjugated diene compounds are selectively bound at their 4—4 carbon atoms due to the presence of the trialkyl phosphine. On the other hand, the aliphatic alcohol is necessary for the formation of a chain oligomer, and thus in the case of lacking the aliphatic alcohol, transfer of the hydrogen atom in the resulting dimer does not occur, whereby a cyclic oligomer is formed.

It is preferable to perform the present process in an inert gas atmosphere, the reaction temperature is preferably 40–120° C., particularly 70–80° C., and the reaction period is preferably 5–15 hours, particularly 8–10 hours. The reaction proceeds best at elevated pressure, e.g., at a pressure of 5–20 kg./cm.$^2$ g.

As explained in detail in the above, the present invention is particularly excellent in that squalene-type-hydrocarbons may advantageously be prepared by selectively combining conjugated diene compounds at their 4—4 position carbons by the use of the specific catalyst system as mentioned above.

Now the present invention will be explained more in detail by the following examples. The pressure in the examples corresponds to the vapor pressure of isoprene at the reaction temperature. Accordingly, the pressure was merely autogenous.

EXAMPLE 1

A pressure bottle having a volume of 100 ml. was purged with nitrogen gas and 50 ml. of isoprene (0.5 mol), 2 mmol of bis-cyclooctadiene-nickel and 8 mmol of tri-n-butyl phosphine introduced therein. These substances were stirred and admixed for 5 minutes at room temperature under the nitrogen atmosphere. Thereafter, 20 ml. of isopropyl alcohol was added to the mixture, the bottle closed tightly and the contents therein shaken for 10 hours at 80° C. while under the nitrogen gas atmosphere. The catalyst was then decomposed by adding a hydrochloric acid solution (6 N HCl-50 ml.) and the reaction mixture subjected to diethyl ether extraction. The ether layer was washed with sodium bicarbonate and then with water, and after being dried, was vacuum distilled. Through the distillation, 27.2 g. of a fraction having a boiling point range of 83–90° C./40 mm. Hg and 1 g. of a distillation residue were obtained, and about 6 g. of unreacted isoprene were recovered.

It was confirmed through capillary gas chromatography (Apiezon L 45 m.×0.25 mm. φ, 70° C.) that the purity of the resulting product was 95% and from NMR and IR data and the carbon-skeleton of the corresponding hydrogenated product (B.P. 75–80° C./40 mm. Hg) that the product had the structure of the above Formula I wherein R=CH$_3$.

EXAMPLE 2

0.5 mol of myrcene, 2 mmol of bis-cyclooctadiene-nickel, 8 mmol of tri-n-butyl phosphine and 20 ml. of isopropyl alcohol were put into a pressure bottle having a volume of 200 ml., and the mixture was treated following the procedure of Example 1 and distilled. Through the distillation, 11 g. of unreacted myrcene (B.P. 93° C./70 mm. Hg) were recovered and 54 g. of reaction product (B.P. 120–130° C./0.35 mm.Hg) were obtained.

It was confirmed through gas chromatography that the purity of the fraction was 95% and from NMR and IR data and the carbon-skeleton of the corresponding hydrogenated product (B.P. 107–110° C./0.2 mm. Hg) that the product had the structure of Formula I wherein R=CH$_2$—CH$_2$—CH=C(CH$_3$)$_2$.

EXAMPLE 3

0.3 mol of farnesene, 1 mmol of bis-cyclooctadiene-nickel, 4 mmol of tri-n-butyl phosphine and 20 ml. of isopropyl alcohol were treated as in Example 1 and distilled. Through the distillation, 13 g. of unreacted farnesene (B.P. 123–125° C./12 mm. Hg) were recovered and 43 g. of reaction product fraction (B.P. 210° C./0.3 mm. Hg) were obtained.

The purity of the fraction obtained was 95% (through gas chromatography). By hydrogenation the fraction was converted to the corresponding saturated hydrocarbon having a boiling point of 205–212° C./1 mm. Hg, which corresponds to known squalene. It was confirmed from the IR and NMR data that the reaction product had the structure of Formula I wherein

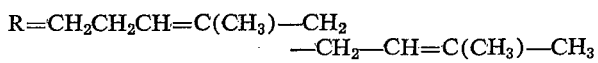

R=CH$_2$CH$_2$CH=C(CH$_3$)—CH$_2$
—CH$_2$—CH=C(CH$_3$)—CH$_3$

While the invention has been described in detail and with reference to specific embodiments thereof, it will be apparent to one skilled in the art that various changes and modifications can be made therein without departing from the spirit and scope thereof.

What is claimed is:

1. A process for the preparation of squalene-type-hydrocarbons of Formula I

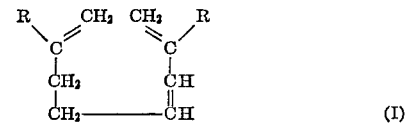

wherein R represents a saturated or unsaturated hydrocarbon group having 1–11 carbon atoms, characterized in that conjugated diene compounds of Formula II

wherein R has the same meaning as mentioned above, are reacted together in an aliphatic alcohol in the presence of catalysts consisting of bis-cyclooctadiene-nickel and a tri-alkyl phosphine, to dimerize the conjugated diene compounds by a 4—4 bond formed therebetween.

2. A process according to claim 1 in which 5 mmol or less of bis-cyclooctadiene-nickel per 1 mol of the conjugated diene compound is used.

3. A process according to claim 1 in which 2–10 mols per 1 mol of the nickel compound of a trialkyl phosphine of the formula R′$_3$P (where R′ represents an alkyl group having 1–10 carbon atoms) are used.

4. A process as claimed in claim 3 where about 4 mols of the trialkyl phosphine per 1 mol of the nickel compound are used.

5. A process as claimed in claim 1 in which 1–10 mmol of bis-cyclooctadiene-nickel per 1 mol of the conjugated dienes are used.

6. A process according to claim 1 in which an aliphatic alcohol of the formula R″OH (where R″ stands for an alkyl group having 1–8 carbon atoms) is used, the alcohol being any one of primary, secondary and tertiary alcohols.

7. A process according to claim 1 in which 20–40% by volume on the basis of the conjugated diene compound of aliphatic alcohol is used.

8. A process according to claim 1 in which the dimerization reaction is performed in an inert gas atmosphere at a reaction temperature of 40–120° C. and for a reaction period of 5–15 hours.

9. A process as claimed in claim 8 where the reaction temperature is 70–80° C.

10. A process as claimed in claim 8 where the reaction time is 8–10 hours.

11. A process as claimed in claim 8 where the reaction pressure is 5–20 kg./cm.$^2$ g.

12. A process according to claim 1 wherein R of Formula I is CH$_3$.

13. A process according to claim 1 wherein R of Formula I is $CH_2-CH_2-CH=C(CH_3)_2$.

14. A process according to claim 1 wherein R of Formula I is $CH_2-CH_2-CH=C(CH_3)-CH_2$
  $-CH_2-CH=C(CH_3)-CH_3$

References Cited
UNITED STATES PATENTS

| | | | |
|---|---|---|---|
| 3,736,264 | 5/1973 | Chauvin et al. | 252—429 R |
| 3,522,321 | 7/1970 | De Young | 260—666 R |
| 3,541,177 | 11/1970 | Hagihara et al. | 260—677 |

OTHER REFERENCES

"The Infrared Spectra of Monoterpenes and Related Compounds," Mitzner et al., Applied Spectroscopy, vol. 19, 1965.

Angen. Chem. 72, 581 (1970).

DELBERT E. GANTZ, Primary Examiner

J. M. NELSON, Assistant Examiner

U.S. Cl. X.R.

260—680 B, 683.15